United States Patent
Sekigawa et al.

(10) Patent No.: US 9,159,355 B1
(45) Date of Patent: Oct. 13, 2015

(54) DVD-RAM HEADER OR LAND/GROOVE DETECTION

(75) Inventors: Sumio Sekigawa, Osaka (JP); Charles Pandana, Fremont, CA (US); Mats Oberg, Cupertino, CA (US); Antoon Dekker, Eindhoven (NL)

(73) Assignee: Marvell International Ltd., Hamilton (BM)

( * ) Notice: Subject to any disclaimer, the term of this patent is extended or adjusted under 35 U.S.C. 154(b) by 806 days.

(21) Appl. No.: 13/010,102

(22) Filed: Jan. 20, 2011

Related U.S. Application Data

(60) Provisional application No. 61/297,222, filed on Jan. 21, 2010.

(51) Int. Cl.
| | |
|---|---|
| G11B 7/00 | (2006.01) |
| G11B 7/002 | (2006.01) |
| G11B 7/24082 | (2013.01) |
| G11B 7/005 | (2006.01) |
| G11B 7/007 | (2006.01) |

(52) U.S. Cl.
CPC .............. *G11B 7/002* (2013.01); *G11B 7/0053* (2013.01); *G11B 7/24082* (2013.01); *G11B 7/007* (2013.01)

(58) Field of Classification Search
CPC .......................... G11B 7/00718; G11B 7/24082
USPC ........................................................ 369/44.13
See application file for complete search history.

(56) References Cited

U.S. PATENT DOCUMENTS

| | | | |
|---|---|---|---|
| 5,872,763 A | 2/1999 | Osakabe | |
| 6,801,488 B2* | 10/2004 | Kato et al. | 369/47.28 |
| 6,912,185 B2* | 6/2005 | Shigeru et al. | 369/47.22 |
| 7,260,050 B2* | 8/2007 | Liu et al. | 369/124.15 |
| 8,130,609 B1 | 3/2012 | Geukens | |
| 2002/0067676 A1* | 6/2002 | Inokuchi et al. | 369/59.15 |
| 2002/0118620 A1* | 8/2002 | Lee et al. | 369/53.21 |
| 2004/0252607 A1* | 12/2004 | Muzio et al. | 369/47.27 |
| 2005/0083797 A1* | 4/2005 | Shigeeda et al. | 369/43 |
| 2007/0274191 A1 | 11/2007 | Tanoue et al. | |

FOREIGN PATENT DOCUMENTS

| | | | |
|---|---|---|---|
| JP | 2006139832 A | * | 6/2006 |
| WO | WO-2005098836 | | 10/2005 |

OTHER PUBLICATIONS

"Final Office Action", U.S. Appl. No. 12/123,222, (Mar. 10, 2011), 10 pages.
"Non-Final Office Action", U.S. Appl. No. 12/123,222, (Sep. 30, 2010), 11 pages.
"Non-Final Office Action", U.S. Appl. No. 12/123,222, (Jul. 18, 2011), 12 pages.
"Notice of Allowance", U.S. Appl. No. 12/123,222, (Nov. 10, 2011), 9 pages.

\* cited by examiner

*Primary Examiner* — Srilakshmi K Kumar
*Assistant Examiner* — Parul Gupta

(57) ABSTRACT

The present disclosure describes techniques for DVD-RAM header or land/groove detection. In some aspects, a wobble signal is integrated, an offset is removed from the integrated wobble signal, and a header is detected in the non-offset integrated wobble signal. In some aspects, a threshold value is adjusted based on a comparison of the received wobble signal and the threshold value, and a header is detected based on the adjusted threshold value.

14 Claims, 7 Drawing Sheets

DVD-RAM HEADER OR LAND/GROOVE DETECTION

RELATED APPLICATIONS

This application claims priority to U.S. Provisional Patent Application Ser. No. 61/297,222 filed Jan. 21, 2010, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Optical storage media, such as digital versatile discs (DVDs), are an effective solution for storing data. DVD media is typically low cost, re-writable, portable, and compatible with most optical drive-equipped devices. Data of a DVD is stored as pits or marks on circular land and groove tracks that an optical head can read, write, and/or re-write as the disc rotates. The land and groove tracks of a DVD may be spiral or concentric depending on the type of the DVD.

Discs employing concentric tracks, such as DVD-random access memory (DVD-RAM) discs, can include embossed headers to address data and indicate whether the data lies in a land track or groove track. A signal provided by the optical head can be analyzed to detect and read header information. The optical head is configured and positioned for reading and/or writing data to a particular land or groove track based on the header information. The signal provided by the optical head, however, can include noise, an offset, and/or various disruptions making header and land/groove detection difficult and complex. Failing to properly detect a header, or incorrectly interpreting noise as a header, degrades performance of a DVD-RAM drive as the information needed to configure and position the optical head is unavailable or incorrect.

SUMMARY

This summary is provided to introduce subject matter that is further described below in the Detailed Description and Drawings. Accordingly, this Summary should not be considered to describe essential features nor used to limit the scope of the claimed subject matter.

A method is described for integrating a wobble signal received from an optical head to produce an integrated wobble signal, removing an offset from the integrated wobble signal to produce a non-offset integrated wobble signal, detecting a header within the non-offset integrated wobble signal by comparing the non-offset integrated wobble signal to a header-detection threshold, and determining that data in a sector associated with the header is stored within a land track or groove track by finding a direction of a transition of the header.

Another method is described for adjusting a threshold value of a wobble signal based on an integrated comparison of an amplitude of the wobble signal with the threshold value, and detecting, based on the adjusted threshold value, a header in the wobble signal.

A System-on-Chip is described that is configured to integrate the wobble signal, remove an offset from the integrated wobble signal to produce a non-offset integrated wobble signal, detect a header within the non-offset integrated wobble signal by comparing the non-offset integrated wobble signal to a header detection threshold, and determine that data in a sector associated with the header is stored within a land track or groove track by finding a direction of a transition of the header.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques for header and land/groove detection may not properly detect a header in a wobble signal that includes noise, an offset, and/or disruptions. Failing to detect a header, or incorrectly interpreting noise as a header, can result in degraded DVD-RAM drive performance as header information necessary for configuring and positioning an optical head is incorrect or unavailable. This disclosure describes techniques for DVD-RAM header or land/groove detection that robustly detect a header in a wobble signal that may include noise, an offset, and/or disruptions to provide accurate header information for configuring and positioning the optical head.

The following discussion describes an operating environment, techniques that may be employed in the operating environment, circuits, and a System-on-Chip (SoC) in which components of the operating environment can be embodied. In the discussion below, reference is made to the operating environment by way of example only.

Operating Environment

Figure 1:
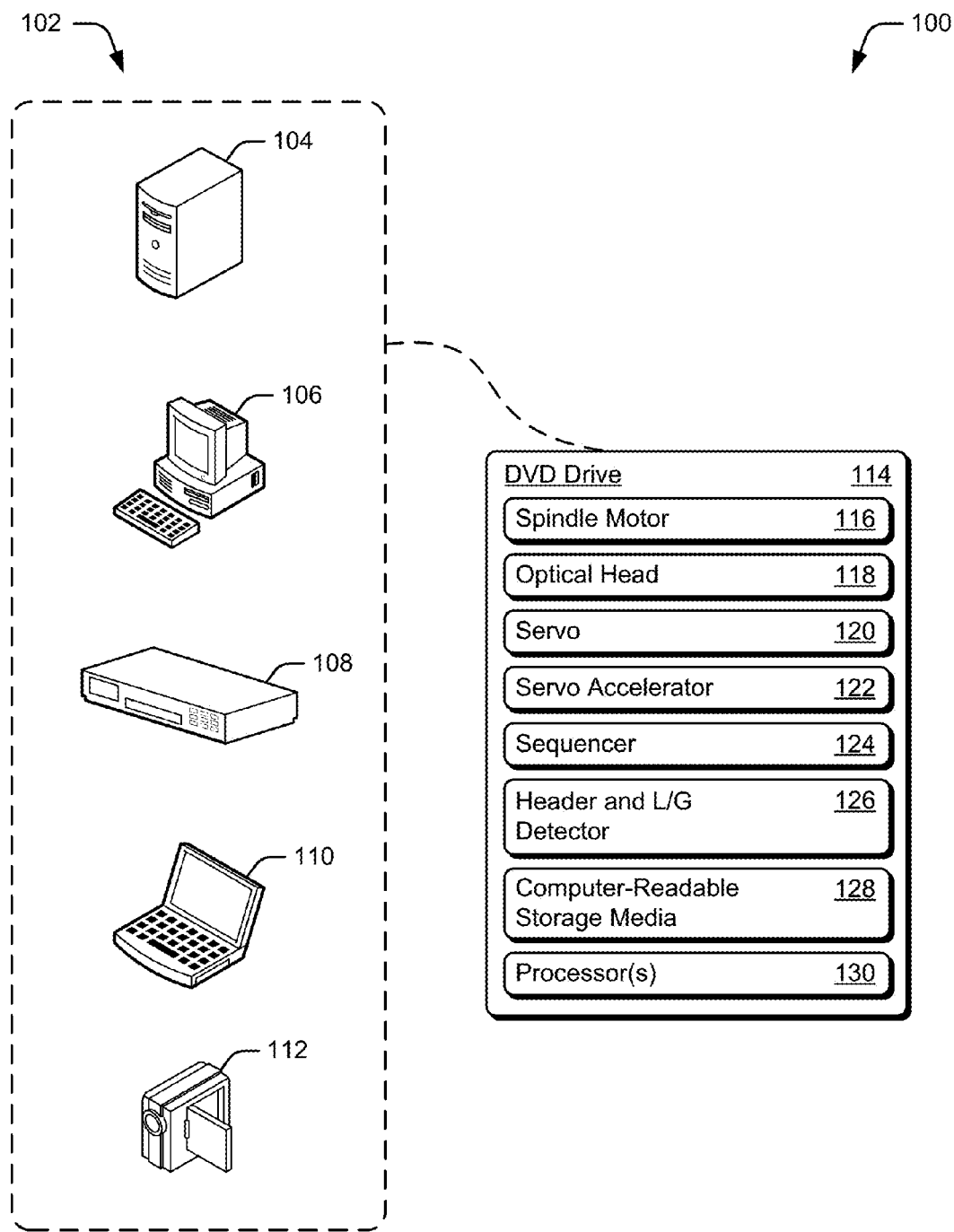
FIG. 1 illustrates an operating environment having optical-drive-equipped devices capable of accessing a DVD in accordance with one or more aspects.

FIG. 1 illustrates an operating environment 100 having digital versatile disc (DVD) drive-equipped devices 102 (devices 102), each of which is capable of accessing DVDs to perform various functions, such as data storage, video recording, and/or audio playback to name a few. DVD drive-equipped devices 102 include server 104, desktop computer 106, set-top box 108, laptop computer 110, and video camera 112.

Any of these devices may read, write, erase, and/or re-write data to a DVD in accordance to various DVD standards, such as DVD-Video, DVD-Audio, DVD±R, DVD±RW, and/or DVD-RAM. In some instances the DVD may be a dual-layer and/or dual-sided disc allowing a DVD to store an increased amount of data. Although each DVD format may have unique characteristics, such as disc structure and/or address format, devices 102 can access multiple DVD formats. For instance, laptop 110 may write data to a DVD-RAM disc to archive data from an internal hard disk drive, as well as read data from DVD-Video disc for video and/or audio playback.

Devices 102 each include a DVD drive 114 for accessing data of a DVD in accordance with various DVD standards including those noted above as well as other optical formats, such as compact disc (CD), recordable CD (CD-R), re-writable CD (CD-RW), and/or video CD (VCD). Additionally or alternately, DVD drive 114 may also support an advanced optical disc format such as BlueRay™ discs (BD) or any other high-definition DVD format.

DVD drive 114 includes a spindle motor 116 to rotate a DVD while an optical head 118 reads, writes, erases, and/or re-writes data to the DVD. Spindle motor 116 may rotate the DVD at any suitable rate, such as a rate corresponding to a maximum data transfer rate (either read or write) of a particular DVD media and/or optical head 118. A servo 120 moves optical head 118 radially across the rotating DVD in order to access the data. Servo 120 is controlled by servo accelerator 122 to position optical head 118 in the proximity of a track containing the data to be accessed. Alternately, a stepper motor system may be implemented to position optical head 118 for accessing data of the DVD (not shown).

Servo accelerator 122 positions optical head 118 via servo 120 based on information relating to an address or position of the data on the DVD. For instance, DVD-RAM discs include embossed headers, which provide address and track-type information for data to be read from or written to the discs. An embossed header may indicate an address for a specific block of data and whether the specific block of data resides on a subsequent land or groove track of a DVD-RAM disc.

While tracking for continuous data reads and/or writes, sequencer 124 can be locked to provide header and track-type information to servo accelerator 122. Servo accelerator 122 uses the header and track-type information to disable or change channel parameters, to mute radial error and/or focus error signals during servo tracking, or to change settings in a radial error-signal formation when the track changes from land to groove or groove to land.

When sequencer 124 is not locked, a header or land/groove (L/G) detector 126 (detector 126) provides header and track-type information to servo accelerator 122. For instance, when randomly accessing specific data of a DVD-RAM disc, detector 126 provides header and track-type information to servo accelerator 122 as optical head 118 moves from track to track.

Detector 126 can be embodied as electronic circuitry, firmware, software, or any combination thereof. Detector 126 (in this implementation) includes a set of computer-executable instructions stored on computer-readable storage media 128. When executed by one or more processors 130, a component on which detector 126 is embodied acts according to those instructions. Detector 126 acts independently and/or in conjunction with various other entities of DVD drive 114, such as being firmware integrated into a System-On-Chip having or communicating with servo accelerator 122 and/or sequencer 124.

Figure 2:
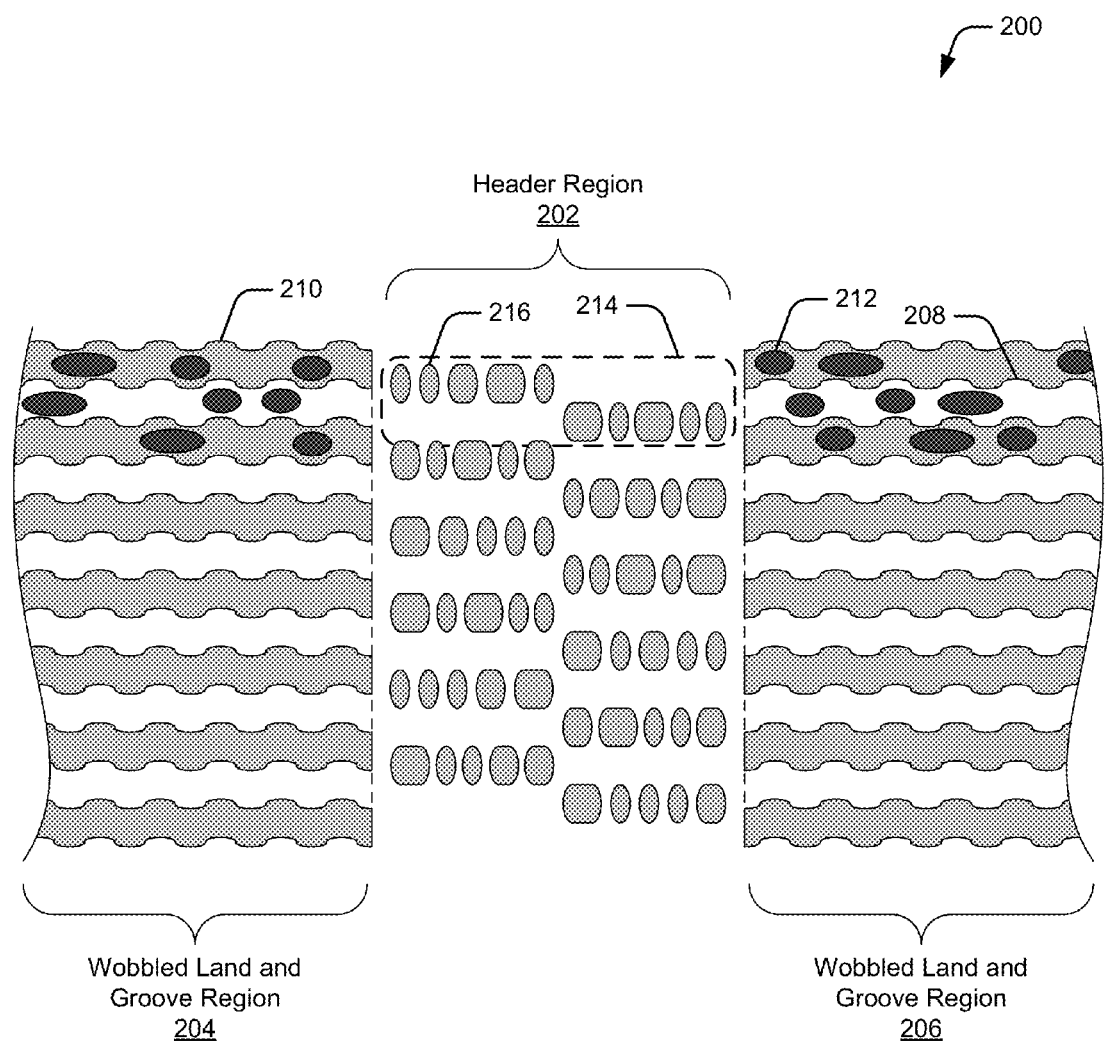
FIG. 2 illustrates a detailed aspect of a DVD-RAM disc.

FIG. 2 illustrates a detailed example of a DVD-RAM disc 200 (disc 200), which is accessed by device 102. Disc 200 includes a header region 202 interposed between wobbled land and groove regions 204 and 206. A sector of disc 200 includes a header region 202 and a subsequent wobbled land and groove region 206. Wobbled land and groove regions 204 and 206 are composed of alternating land tracks 208 and groove tracks 210.

As disc 200 rotates, address and header information is read from header region 202 to locate data in wobbled land and groove regions 204 and 206. Detector 126 detects and reads header region 202 to locate data in wobbled land and groove region 206. The location of the data and information from header region 202 are used to position and configure optical head 118 to access the information.

A wobble of the land or groove track is used to clock data access or to provide a channel clock. For instance, a DVD-RAM disc containing wobbles in a land or groove track defines a wobble frequency or a wobble period of 186 clocks (186 $T_W$). A channel clock based on the wobble signal of a DVD-RAM disc provides 186 clocks per wobble period. Optical head 118 can detect a wobble of a land or groove track to provide a clock for detector 126 or other circuitry of DVD drive 114.

Disc 200 stores data using record marks 212, which are optically distinguishable by optical head 118 on land track 208 or groove track 210. Optical head 118 can also write or erase these record marks 212 effective to alter data on land track 208 or groove track 210. An address of subsequent data stored on land track 208 or groove track 210 is delineated by header region 202.

Header region 202 includes header 214 which contains complimentary allocated pit addressing (CAPA) information formed by one or more embossed pits, such as embossed pit 216. CAPA information is read from header 214 to locate data stored on, or write data, to disc 200. For example, as optical head 118 reads header 214, detector 126 can analyze a wobble signal generated by optical head 118 to detect and read information from header 214 while reading data from disc 200 or writing data to disc 200.

Header 214 is offset from land track 208 and groove track 210 by about one-half of a track width. In this example, header 214 is offset by 37 µm because land track 208 and groove track 210 have a track pitch of 74 µm. Information contained in header 214 indicates whether data is located in an offset land track or an offset groove track. Detector 118 can analyze a wobble signal provided by optical head 118 to determine that data associated with header 214 can be accessed in groove track 212 for example.

Techniques of DVD-RAM Header and Land/Groove Detection

The following discussion describes techniques of DVD-RAM header and land/groove detection. These techniques can be implemented using the previously described environment, such as by detector 126 of FIG. 1 embodied on servo accelerator 122, sequencer 124, and/or any other circuits (integrated or otherwise) of DVD drive 114. These techniques include methods illustrated in FIG. 3 and FIG. 5, each of which is shown as a set of operations performed by one or more entities. These methods are not necessarily limited to the orders shown for performing the operations. Further, these methods may be used in conjunction with one another whether performed by the same entity, separate entities, or any combination thereof. In portions of the following discussion, reference will be made to operating environment 100 of FIG. 1 by way of example. Such reference is not to be taken as limited to operating environment 100 but rather as an illustration of one of a variety of examples.

Figure 3:
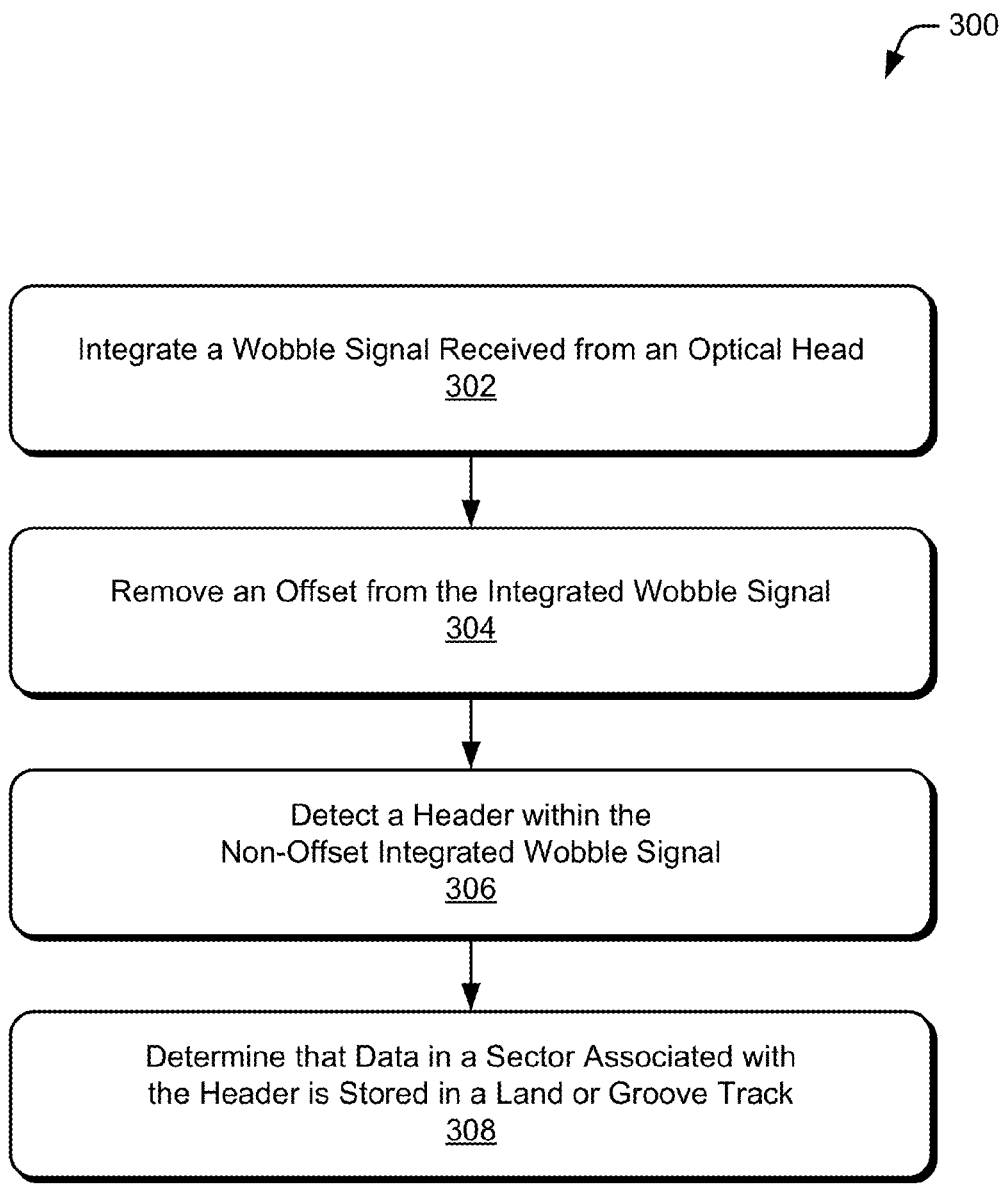
FIG. 3 illustrates a method of DVD-RAM header and land/groove detection having a header signal detected in a non-offset integrated wobble signal.

FIG. 3 depicts a method 300 for header and land/groove detection, including operations performed by detector 126 of FIG. 1.

At 302, a wobble signal is integrated to mitigate noise of the wobble signal. For example, detector 126 receives, from optical head 118, and then integrates a wobble signal read from the DVD-RAM to mitigate noise of the wobble signal. Detector 126 integrates the wobble signal when the signal exceeds a minimum or maximum threshold.

As an example of wobble signal integration based on the channel clock, consider Equation 1 below.

$$I_k = \sum_{i=0}^{185} [1(RF\_PP_{186k-i} > TOP) - 1(RF\_PP_{186k-i} < BOTTOM)] \quad \text{Equation 1}$$

Equation 1 illustrates an integration of the wobble signal (RF_PP) over 186 wobble clocks (i) with argument functions comparing the wobble signal to minimum or maximum wobble signal thresholds (TOP or BOTTOM). In the context of the present example, detector 126 performs the integration of the wobble signal as described by Equation 1 to mitigate the noise of the wobble signal.

Additionally or alternately, the threshold offset may be adjusted based on a positive or negative value of integration output. This accounts for an offset of the wobble signal. Continuing the present example, detector 126 reduces the offset of wobble signal threshold based on the integration of the wobble signal having a negative value. Adjusting the threshold offset can improve header and land/groove detection when the value of the integration output is not close to zero.

In some instances, detector 126 integrates the wobble signal over a wobble period of DVD-RAM (e.g. 186 $T_W$). Sampling of the wobble signal for integration can be based on, or locked onto, the channel clock of the wobble signal, which provides 186 clocks per wobble period. In other cases, a sampling clock having a frequency similar to the channel clock is used for sampling the wobble signal. Although the sampling clock may have a similar frequency to the channel clock, it is not necessary for the sampling clock to be locked onto the channel clock or provide exactly 186 clocks per wobble.

In other instances, detector 126 overlaps multiple integrations of the wobble signal to reduce a delay in the integration of the wobble signal. Additionally or alternately, the multiple integrations can include integrations of less than one wobble period. For example, a summation of two integrations over one-half of a wobble period (e.g. 93 $T_W$) reduces delay of the total integration. Equation 2 illustrates a summation of two integrations over one-half a wobble period with the same variables described in relation to Equation 1. Although Equation 2 illustrates an example of a summation of two integrations, more than two integrations may be summed in order to further reduce integration delay.

$$Y_k^{(2)} = \sum_{i=0}^{92} [1(RF\_PP_{93k-i} > TOP) - 1(RF\_PP_{93k-i} < BOTTOM)] \quad \text{Equation 2}$$

$$I_k = Y_{k-1}^{(2)} + Y_k^{(2)}$$

At 304, an offset is removed from the integrated wobble signal to produce a non-offset wobble signal. The offset of the wobble signal can be determined and removed by varying means. For instance, the integrated wobble signal can be passed through a low-pass filter to determine a residual offset of the integration of the wobble signal. In other instances, an averaging filter configured as an infinite impulse response (IIR) filter can remove the offset from the integrated wobble signal. In the context of the current example, detector 126 removes an offset from the integrated wobble signal by passing the wobble signal through an IIR filter to produce a non-offset integrated wobble signal.

In some cases, the offset of the wobble signal is determined in the wobble region to prevent the header region from affecting the determined offset or to avoid offset being removed from the header signal. In such a case, the mechanism for determining the offset of the wobble signal may be disabled or bypassed when a header region is detected. For example, the IIR filter of detector 126 may be disabled responsive to detecting a header region.

At 306, a header is detected within the non-offset integrated wobble signal by comparing the non-offset integrated wobble signal to a header detection threshold. The header detection threshold may be a minimum detection threshold or a maximum detection threshold. In some instances, the header detection threshold is less than a corresponding wobble signal detection threshold. Continuing the present example, detector 126 compares the non-offset integrated wobble signal to a header detection threshold and detects a header.

At 308, it is determined that data in a sector associated with the header is stored within a land track or groove track by finding a direction of a transition of the header. In some instances, finding the direction of the transition is responsive to detecting a header in the wobble signal. In other instances, the direction of the transition can be found by periodic sampling based on a frequency or clock, such as the wobble frequency. Concluding the present example, detector 126 determines that data associated with the header is in a subsequent land groove by finding a direction of a transition of the header.

Figure 4:
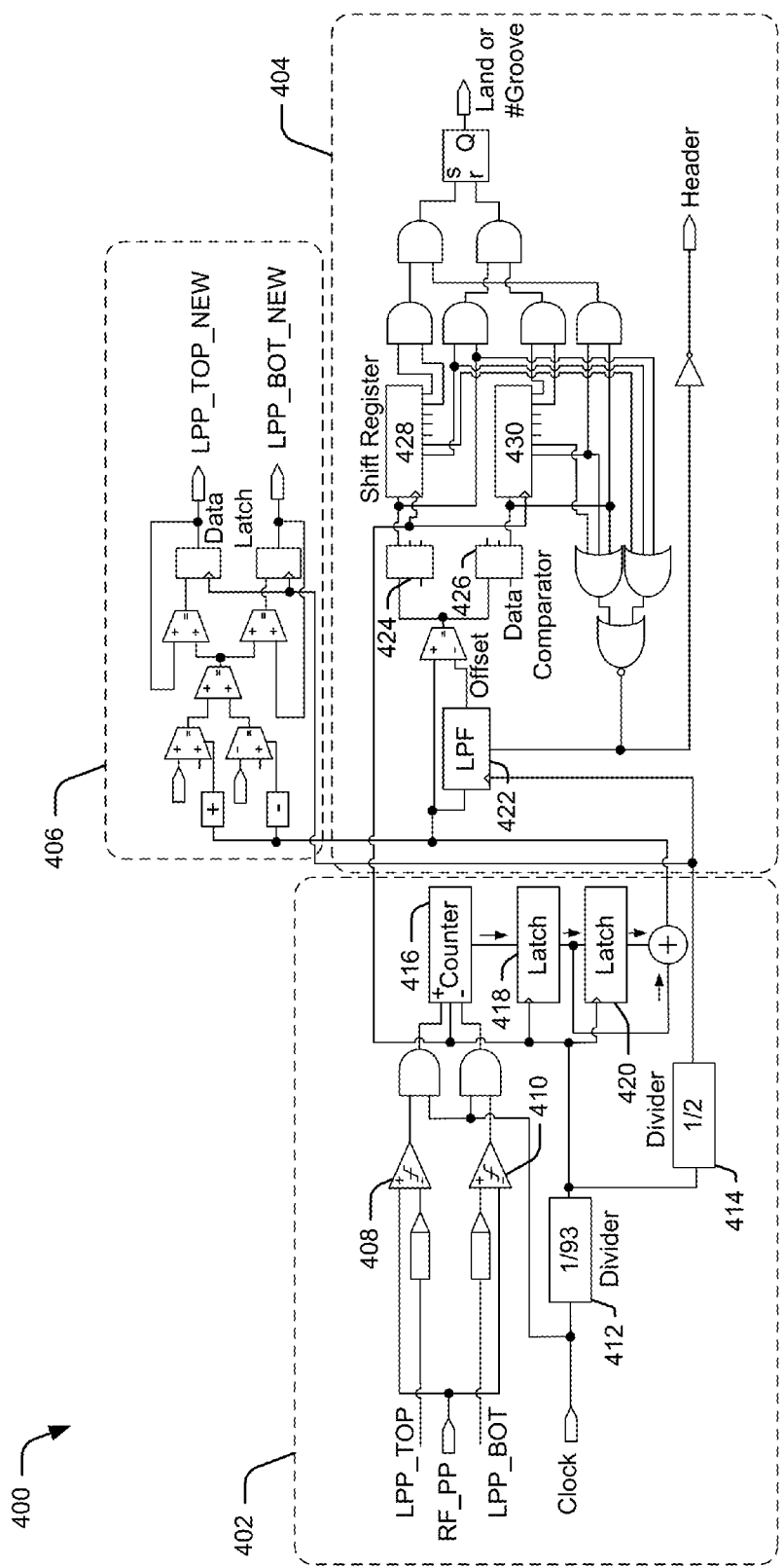
FIG. 4 illustrates an apparatus capable of implementing one or more aspects of the method shown in FIG. 3.

FIG. 4 illustrates an example of apparatus 400, which is capable of performing one or more aspects of method 300. Although shown as logic, apparatus 400 may be implemented as fixed logic, firmware, software, or any combination thereof. In this example, components of apparatus 400 are grouped into logic sections 402, 404, and 406. Generally, apparatus 400 provides outputs indicating detection of a header and selection of a land/groove track.

Section 402 of apparatus 400 includes comparators 408, 410 for detecting a wobble signal (RF_PP) and clock dividers 412, 414 to reduce the clock frequency for other sections of apparatus 400. Section 402 also includes an integrator based on an 8-bit counter 416 and two 8-bit data latches 418, 420 for integrating the wobble signal to produce an integrated wobble signal.

An offset of the integrated wobble signal is determined by a low-pass filter (LPF) 422 of section 404 and removed to produce a non-offset integrated wobble signal. Header and land/groove outputs are provided by combinatorial circuitry of section 404 including data comparators 424, 426, 7-bit shift registers 428, 430, and various logic gates. Section 406 adjusts offsets of the wobble signal thresholds based on the output of the integrator of section 402 to compensate for a residual offset of the integrated wobble signal.

Figure 5:
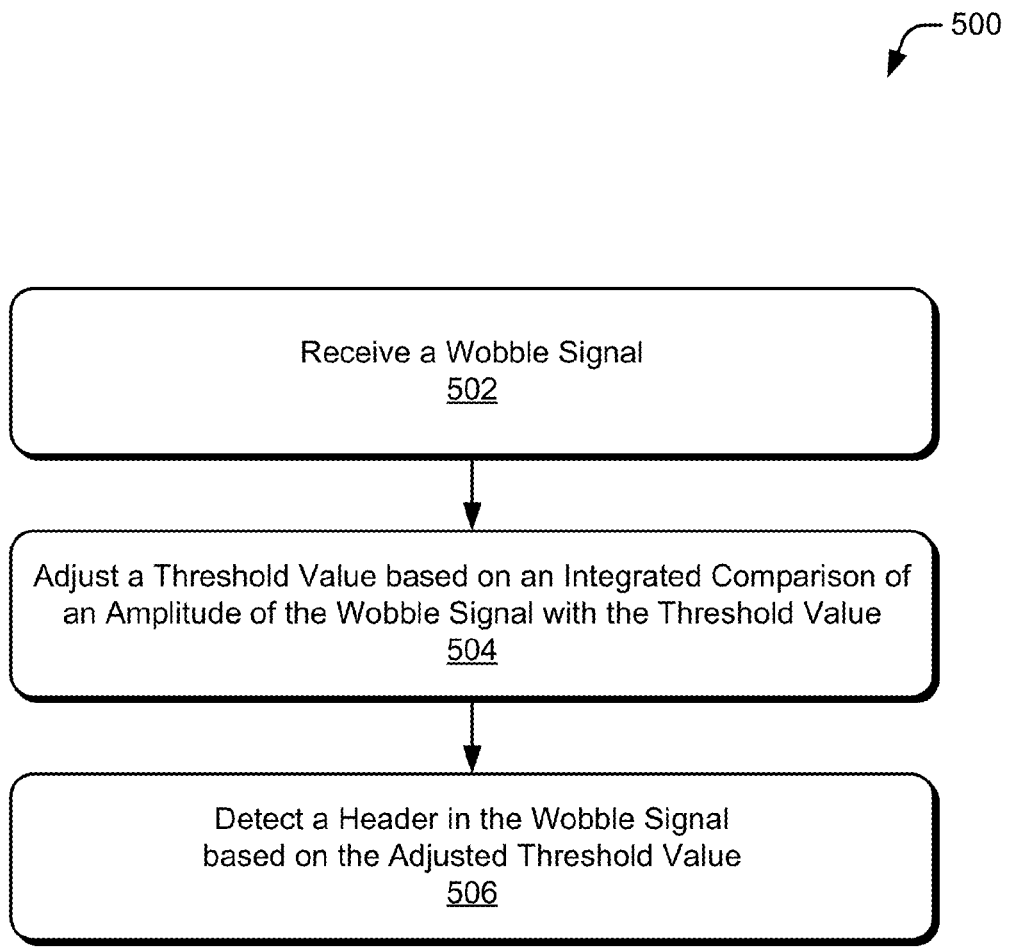
FIG. 5 illustrates a method of DVD-RAM header and land/groove detection having a header signal detected based on an adjusted threshold value.

FIG. 5 depicts a method 500 for header and land/groove detection, including operations performed by detector 126 of FIG. 1.

At 502, a wobble signal is received. The wobble signal may be received from an optical read/write head, such as optical head 118. For example, detector 126 may receive a wobble signal from optical head 118 as a DVD-RAM discs rotates.

At 504, a threshold value is adjusted based on an integrated comparison of the wobble signal with the threshold value. Integrating a result of a comparison of the wobble signal with the current threshold value provides feedback for adjusting the threshold value. In some instances, a threshold value is adjusted based on a comparison of the amplitude of a wobble signal and the threshold value to provide an adjusted threshold value. The comparison of the amplitude of the wobble signal and the threshold value can be based on a maximum or minimum amplitude of the wobble signal in a non-header region.

Adjusting a threshold value to approximately the minimum or maximum amplitude of the wobble signal in a non-header region allows a header region of the wobble signal to be detected when the wobble signal exceeds the adjusted threshold value. An output of a low-pass-filtered integrator may approach zero in the non-header region of the wobble signal when the threshold is properly adjusted.

Alternately or additionally, the integrated comparison of the threshold value and the amplitude of the signal may be filtered to reduce noise. In the context of the present example, detector 126 adjusts a threshold value based on an integrated comparison of the threshold value with an amplitude of the wobble signal received from optical head 118.

At 506, a header is detected in the wobble signal based on the adjusted threshold value. The header may be detected when the amplitude of the wobble signal exceeds the adjusted threshold value for an amount of time. In some cases, a direction of a transition of the header is detected, from which detector 126 infers that data associated with the header can be accessed in a land or groove track. The transition of the header may be detected between a second section and a third section of the header as a positive or negative change in header polarity. Once a legitimate header transition is detected, land/groove detection may be disabled for at least one-third of a sector to prevent incorrect land/groove detections.

In some cases, the direction of the transition of the header is determined when a difference of the integrated comparisons of the minimum and maximum wobble signal amplitudes with their respective adjusted threshold values exceeds a positive or negative header transition threshold value. Continuing the present example, detector 126 detects a transition between a second and a third section of a header when the difference between an integrated comparison of the maximum and minimum exceeds the header transition threshold value.

In some instances, adjustment of the wobble signal threshold value is stopped or bypassed when a header is detected to prevent the header from affecting the threshold value. Alternately or additionally, detection of an additional header may be prevented by disabling header detection when a first header is detected for at least a portion of a header length or period. Concluding the present example, detector 126 ceases to adjust the threshold value when the header is detected and prevents another header from being detected for at least the remainder of the header period.

Figure 6:
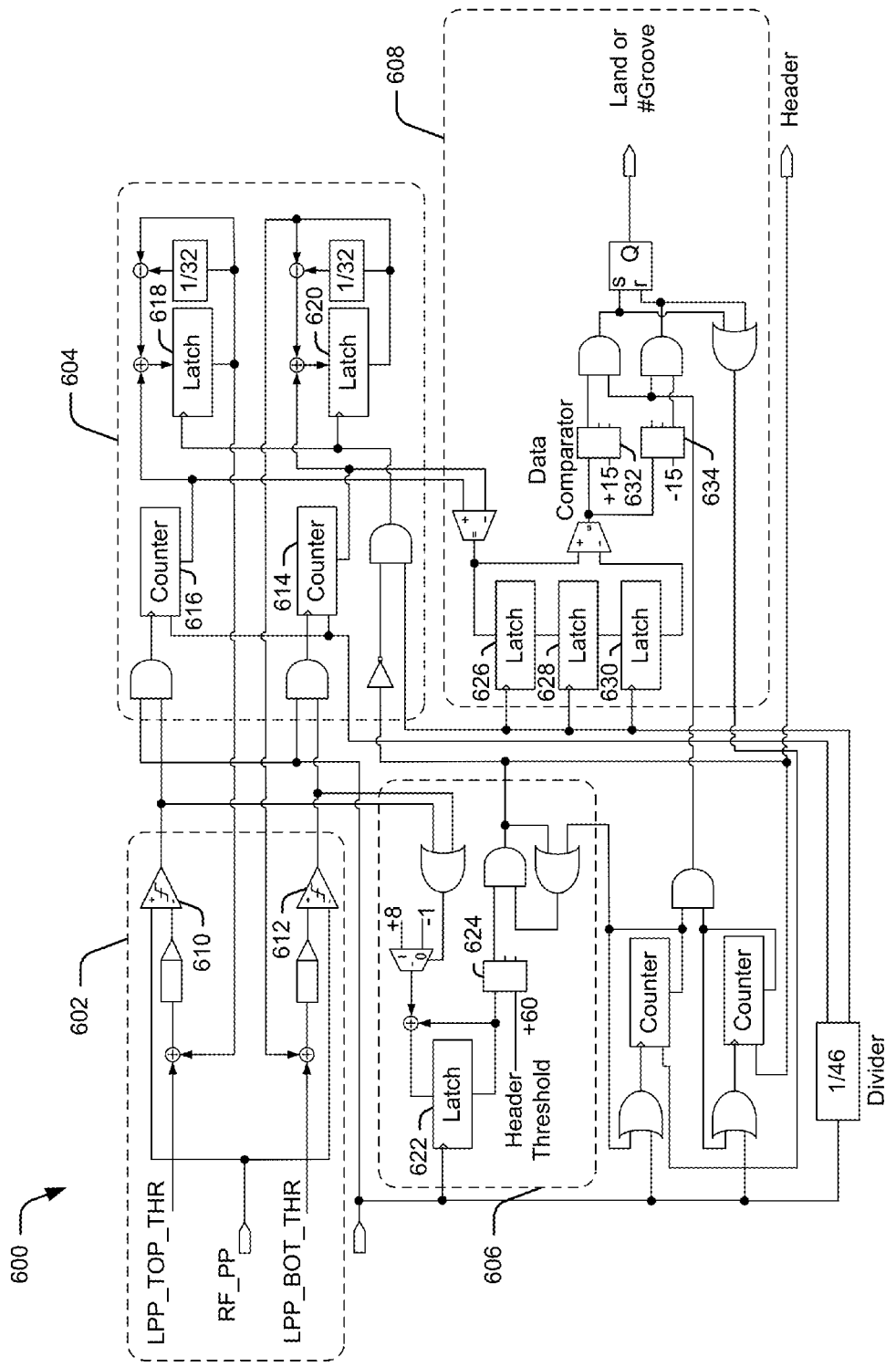
FIG. 6 illustrates an apparatus capable of implementing one or more aspects of the method shown in FIG. 5.

FIG. 6 illustrates an example of apparatus 600, which is capable of performing one or more aspects of method 500. Although shown as logic, apparatus 600 may be implemented as fixed logic, firmware, software, or any combination thereof. In this example, components of apparatus 600 are grouped into logic sections 602, 604, 606, and 608. Generally, apparatus 600 provides outputs indicating detection of a header and selection of a land/groove track.

Section 602 of circuit 600 includes an analog section having comparators 610, 612 for detecting a wobble signal (RF_PP) by comparing the wobble signal to threshold values LPP_TOP_THR and LPP_BOT_THR. Section 604 suppresses noise of the wobble signal using a low-pass filter including counters 614, 616 and latches 618, 620 to provide feedback to section 602 for adjusting the threshold values.

Section 606 includes 8-bit data latch 622 and data comparator 624 for detecting a header within the wobble signal based on the adjusted threshold values. A direction of a transition of a header is detected by section 608 that includes a series of cascaded 6-bit data latches 626, 628, and 630, and data comparators 632, 634.

System-on-Chip

Figure 7:
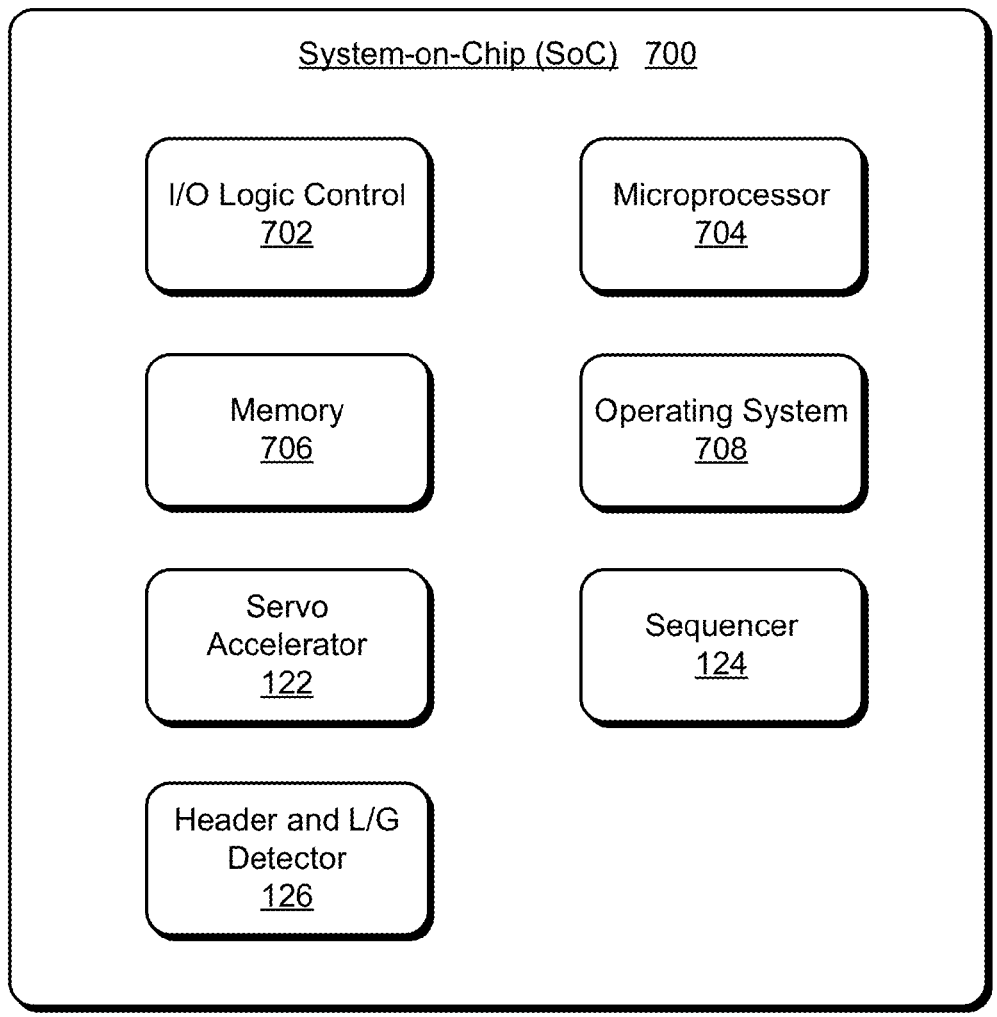
FIG. 7 illustrates a System-on-Chip (SoC) environment for implementing aspects of the techniques described herein.

FIG. 7 illustrates a System-on-Chip (SoC) 700, which can implement various aspects described above. An SoC can be implemented in a fixed or mobile device, such as a computing device, game console, video camera, printer, DVD recorder, digital video recorder, and/or any other type of device that may include DVD optical drive.

SoC 700 can be integrated with electronic circuitry, a microprocessor, memory, input-output (I/O) logic control, communication interfaces and components, other hardware, firmware, and/or software needed to run an entire device. SoC 700 can also include an integrated data bus (not shown) that couples the various components of the SoC for data communication between the components. A DVD drive-equipped device that includes SoC 700 can also be implemented with many combinations of differing components.

In this example, SoC 700 includes an input-output (I/O) logic control 702 (e.g., to include electronic circuitry) and a microprocessor 704 (e.g., any of a microcontroller or digital signal processor). SoC 700 also includes a memory 706, which can be any type of random access memory (RAM), a low-latency nonvolatile memory (e.g., flash memory), read only memory (ROM), and/or other suitable electronic data storage. SoC 700 includes various firmware and/or software, such as an operating system 708, which can be computer-executable instructions maintained by memory 706 and executed by microprocessor 704. SoC 700 can also include other various communication interfaces and components, communication components, other hardware, firmware, and/or software.

SoC 700 includes servo accelerator 122, sequencer 124, and detector 126 (embodied as disparate or combined components as noted above). Examples of these various components, functions, and/or entities, and their corresponding functionality, are described with reference to the respective components of the environment 100 shown in FIG. 1.

Detector 126 in SoC 700, either independently or in combination with other entities, can be implemented as computer-executable instructions maintained by memory 706 and executed by microprocessor 704 to implement various aspects and/or features described herein. Detector 126 may also be provided integral with other entities of the SoC, such as integrated with one or both of servo accelerator 122 or sequencer 124. Alternatively or additionally, detector 126 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   adjusting, based on a previously-integrated portion of a wobble signal, a minimum or a maximum signal threshold configured to enable integration of subsequently received portions of the wobble signal;

receiving, subsequent to adjusting the minimum or the maximum signal threshold, another portion of the wobble signal from an optical head;

integrating, when the adjusted minimum or the adjusted maximum signal threshold is exceeded, the other portion of the wobble signal to produce another integrated portion of the wobble signal;

filtering, via a low-pass filter, the other integrated portion of the wobble signal to determine an offset for the other integrated portion of the wobble signal;

removing, subsequent to integrating the other portion of the wobble signal, the offset from the other integrated portion of the wobble signal to produce a non-offset integrated portion of the wobble signal;

detecting a header within the non-offset integrated portion of the wobble signal based on the non-offset integrated portion of the wobble signal and a header-detection threshold; and determining that data in a sector associated with the header is stored within a land track or groove track based on a direction of a transition of the header.

2. The method of claim 1, further comprising, responsive to detecting the header within the non-offset integrated portion of the wobble signal, ceasing to filter the other integrated portion of the wobble signal with the low-pass filter.

3. The method of claim 1, wherein integrating the other portion of the wobble signal includes summing overlapped integrations of the other portion of the wobble signal, the overlapped integrations including an integration of less than a wobble period.

4. The method of claim 3, wherein the summed overlapped integrations of the other portion of the wobble signal include at least two integrations that are each performed over one-half of the wobble period.

5. The method of claim 1, wherein integrating the other portion of the wobble signal includes sampling the other portion of the wobble signal at a frequency, the frequency corresponding to a wobble frequency of the wobble signal.

6. The method of claim 1, wherein detecting the header within the non-offset integrated portion of the wobble signal is responsive to the non-offset integrated portion of the wobble signal exceeding the header-detection threshold for a particular amount of time.

7. The method of claim 1, wherein the header-detection threshold is less than a corresponding one of the adjusted minimum or the adjusted maximum signal threshold.

8. The method of claim 1, wherein determining that data in the sector associated with the header is stored within the land track or groove track includes sampling the non-offset integrated portion of the wobble signal at a frequency to determine the direction of the transition of the header, the frequency corresponding to a wobble frequency of the wobble signal.

9. A system-on-chip comprising:
input logic configured to receive a wobble signal; and
a header and land/groove detector configured to:
adjust, based on a previously-integrated portion of a wobble signal, a minimum or a maximum signal threshold configured to enable integration of subsequently received portions of the wobble signal;
receive, subsequent to adjusting the minimum or the maximum signal threshold, another portion of the wobble signal from the input logic;
integrate, based on the adjusted minimum or the adjusted maximum signal threshold, the other portion of the wobble signal to produce another integrated portion of the wobble signal;
filter, via a low-pass filter, the other integrated portion of the wobble signal to determine an offset for the other integrated portion of the wobble signal;
remove, subsequent to integrating the other portion of the wobble signal, the offset from the other integrated portion of the wobble signal to produce a non-offset integrated portion of the wobble signal;
detect a header within the non-offset integrated portion of the wobble signal based on the non-offset integrated portion of the wobble signal and a header-detection threshold; and
determine that data in a sector associated with the header is stored within a land track or groove track based on a direction of a transition of the header.

10. The system-on-chip of claim 9, wherein the header and land/groove detector is further configured to cease to filter the other integrated portion of the wobble signal in response to detecting a header within the non-offset integrated portion of the wobble signal.

11. The system-on-chip of claim 9, wherein the header and land/groove detector is further configured to integrate the other portion of the wobble signal by summing overlapped integrations of the wobble signal.

12. The system-on-chip of claim 11, wherein the overlapped integrations include an integration of less than a wobble period.

13. The system-on-chip of claim 9, wherein the header-detection threshold is less than a corresponding one of the adjusted minimum or the adjusted maximum signal threshold.

14. The system-on-chip of claim 9, wherein the system-on-chip is implemented in an optical storage drive.

* * * * *